(12) United States Patent
Ames (10) Patent No.: US 12,088,034 B2
(45) Date of Patent: *Sep. 10, 2024

(54) SYSTEM AND METHOD FOR SAFETY PLUGS

(71) Applicant: Ryan M. Ames, Seattle, WA (US)

(72) Inventor: Ryan M. Ames, Seattle, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/243,380

(22) Filed: Sep. 7, 2023

(65) Prior Publication Data

US 2023/0420880 A1 Dec. 28, 2023

Related U.S. Application Data

(60) Division of application No. 17/739,322, filed on May 9, 2022, now Pat. No. 11,799,229, which is a continuation of application No. 17/336,761, filed on Jun. 2, 2021, now Pat. No. 11,387,590.

(51) Int. Cl.
*H01R 13/443* (2006.01)

(52) U.S. Cl.
CPC .................. *H01R 13/443* (2013.01)

(58) Field of Classification Search
CPC .................. H01R 13/443; H02G 3/14
See application file for complete search history.

(56) References Cited

U.S. PATENT DOCUMENTS

| | | | |
|---|---|---|---|
| 801,536 A * | 10/1905 | Marshall | H02G 3/14 220/241 |
| 1,726,429 A * | 8/1929 | Ferris | H01R 25/006 174/66 |
| 1,726,430 A | 8/1929 | Ferris | |
| 2,428,167 A * | 9/1947 | Linton | H01H 9/161 220/241 |
| 2,740,873 A | 4/1956 | Cronk | |
| 3,438,534 A | 4/1969 | Zerwes | |
| 4,676,570 A | 6/1987 | Pincherri | |
| 6,023,021 A * | 2/2000 | Matthews | H02G 3/14 220/241 |
| 6,051,788 A | 4/2000 | Nichols | |
| 6,159,034 A | 12/2000 | Royer | |
| 6,309,239 B1 | 10/2001 | Johnston | |
| 6,664,471 B1 | 12/2003 | Howe, Jr. | |
| D502,687 S | 3/2005 | Sherman | |
| 7,070,426 B2 | 7/2006 | DeCell, Jr. et al. | |
| 7,094,969 B1 | 8/2006 | In | |
| 7,119,278 B1 | 10/2006 | Shotey | |
| 7,652,210 B2 | 1/2010 | White | |

(Continued)

OTHER PUBLICATIONS

"3D printed TV Cable Baby proof proofing safety coaxial outlet plug cover 2 pieces," https://jordan.desertcart.com/products/22023519-3d-printed-tv-cable-baby-proof-proofing-safety-coaxial-outlet-plug-cover-2-pieces [Date accessed: Dec. 17, 2020].

(Continued)

*Primary Examiner* — Travis S Chambers
(74) *Attorney, Agent, or Firm* — Bold IP PLLC; Christopher Mayle (57) ABSTRACT

A system and method directed for one or more safety plugs whereby safety plugs may either be individual plates that will insert into unused Telephone, Ethernet, and USB outlets, the safety plug may also be an individual coaxial plate that will cover a coaxial stud thus preventing any damage.

11 Claims, 10 Drawing Sheets

(56) References Cited

U.S. PATENT DOCUMENTS

| | | |
|---|---|---|
| 8,212,146 B1 | 7/2012 | Moore |
| 8,414,314 B1 | 4/2013 | Mosholder |
| 8,449,309 B1 | 5/2013 | Mosholder |
| 8,845,355 B2 | 9/2014 | Litowitz et al. |
| D735,678 S | 8/2015 | Wyatt |
| D755,607 S | 5/2016 | Baber |
| D760,173 S * | 6/2016 | Baker .......................... D13/156 |
| 9,553,437 B1 | 1/2017 | Martin |
| 10,164,376 B2 | 12/2018 | Tsay |
| 10,587,067 B2 * | 3/2020 | Lager ................... H01R 13/447 |
| 11,387,590 B1 * | 7/2022 | Ames ................... H01R 13/443 |
| 11,799,229 B2 * | 10/2023 | Ames ....................... H02G 3/14 |
| 2012/0006577 A1 | 1/2012 | Brantley et al. |
| 2012/0108088 A1 | 5/2012 | Peng |
| 2012/0289069 A1 | 11/2012 | Chueh et al. |
| 2013/0102167 A1 | 4/2013 | Litowitz et al. |
| 2014/0113468 A1 | 4/2014 | McBane |
| 2014/0118891 A1 | 5/2014 | Crane et al. |

OTHER PUBLICATIONS

"Dreambaby White Outlet Covers 2-Pack," lowes.com. htttps://www.lowes.com/pd/Dreambaby-Outlet-Covers/1000616503 [Date accessed: Dec. 17, 2020].

\* cited by examiner

SYSTEM AND METHOD FOR SAFETY PLUGS

CROSS REFERENCE TO RELATED APPLICATIONS

This divisional patent application claims priority to U.S. patent application Ser. No. 17/739,322, filed on May 9, 2022, issued as U.S. Pat. No. 11,799,229 on Oct. 24, 2023, which is a continuation of U.S. patent application Ser. No. 17/336,761, filed on Jun. 2, 2021, and issued as U.S. Pat. No. 11,387,590 on Jul. 12, 2022.

FIELD OF DISCLOSURE

The field of disclosure is generally directed to safety plugs and more particularly to individual plates that will insert into unused outlets such as USB, Ethernet, Telephone, USB-C, Coaxial and will conceal all of the said outlets and thus create a safety barrier to the electrical output of the components as well as any damage to said outlets.

BACKGROUND

When childproofing a home, parents often look to purchase a product to cover exposed electric outlets but overlook the other exposed outlets in their home; USB, Ethernet, Telephone, and Coaxial that also provide an increased opportunity for children to come in contact with and cause harm to themselves, and damage to the said receptacle.

In U.S. Pat. No. 7,119,278, a cover plate exists that is thin and rectangularly shaped, with apertures to receive plug blades, which replaces the faceplate and is attached to the socket mechanism with a screw. In U.S. Pat. No. 4,676,570, a cover plate exists to replace a standard faceplate, which is attached with a center screw, with a plate that attaches to the electrical socket using concealed flanges for a "snap fit" to the outlet. In U.S. Pat. No. 6,664,471, a removable socket cover exists, consisting of a panel and sidewalls, for the purpose of temporarily protecting the socket and wiring from paint drips and spatters during a painting project. In U.S. Pat. Nos. 7,094,969 and 6,159,034, safety related devices exist that cover electrical outlets and sockets by attaching a pivoting, hinged or sliding door apparatus. In U.S. Pat. No. 6,309,239, attaching a hinged boxlike plug enclosure covers provides a barrier to the electrical outlet. In U.S. Pat. No. 6,051,788, attaching a thick faceplate that prevents simultaneous contact of the fingers of a person holding a plug with the bare metal prong as it contacts the receptacle's electrical contacts. In U.S. Pat. No. 8,212,146, the cover panel includes a solid panel front surface of non-conductive molded material with a paintable surface on the outside and posts adapted to fit into the orifices of an electrical socket on the inside. These prior art references do not provide cover for USB, Ethernet, Telephone or Coaxial outlets nor provide structure and stiffness to keep the covers from breaking into small parts that could in turn become a choking hazard. In addition, the prior art references may lead to warping because of a lack of consistent wall thickness throughout the entire part. Thus, exists a need for a new and improved system and method for safety plug covers.

SUMMARY

The disclosure presented herein relates to a safety cover that utilizes one or more rows of cavities with one or more specific shapes and patterns to provide structure and stiffness to keep the covers from breaking small parts whereby the interfacing elements are positioned on ridges between the cavities and extend into the cavities. The cavities on the back of the plugs are structured to keep the parts from warping and to help keep a consistent wall thickness throughout the entire part which will result in better molding results

BRIEF DESCRIPTION OF DRAWINGS

The present invention will be described by way of exemplary embodiments, but not limitations, illustrated in the accompanying drawings in which like references denote similar elements, and in which.

DETAILED DESCRIPTION

In the Summary above and in this Detailed Description, and the claims below, and in the accompanying drawings, reference is made to particular features of the invention. The term "comprises" and grammatical equivalents thereof are used herein to mean that other components, ingredients, steps, etc. are optionally present. For example, an article "comprising" (or "which comprises") components A, B, and C can consist of (i.e., contain only) components A, B, and C, or can contain not only components A, B, and C but also contain one or more other components.

Where reference is made herein to a method comprising two or more defined steps, the defined steps can be carried out in any order or simultaneously (except where the context excludes that possibility), and the method can include one or more other steps which are carried out before any of the defined steps, between two of the defined steps, or after all the defined steps (except where the context excludes that possibility).

The term "at least" followed by a number is used herein to denote the start of a range including that number (which may be a range having an upper limit or no upper limit, depending on the variable being defined). For example, "at least 1" means 1 or more than 1. The term "at most" followed by a number is used herein to denote the end of a range, including that number (which may be a range having 1 or 0 as its lower limit, or a range having no lower limit, depending upon the variable being defined).

"Exemplary" is used herein to mean "serving as an example, instance, or illustration." Any aspect described in this document as "exemplary" is not necessarily to be construed as preferred or advantageous over other aspects Throughout the drawings, like reference characters are used to designate like elements. As used herein, the term "coupled" or "coupling" may indicate a connection. The connection may be a direct or an indirect connection between one or more items. Further, the term "set" as used herein may denote one or more of any item, so a "set of items," may indicate the presence of only one item, or may indicate more items. Thus, the term "set" may be equivalent to "one or more" as used herein.

In the following detailed description, numerous specific details are set forth in order to provide a more thorough understanding of the one or more embodiments described herein. However, it will be apparent to one of ordinary skill in the art that the invention may be practiced without these specific details. In other instances, well-known features have not been described in detail to avoid unnecessarily complicating the description.

The present invention solves the need for safety plug covers that utilize one or more ribs with one or more specific shape and patterns to provide structure and stiffness to keep the covers from breaking thus making small parts that could be considered a choking hazard. Also, the ribs on the back of the plugs are structural to keep the parts from warping and to help keep a consistent wall thickness throughout the entire part which will result in better molding results.

Figure 1:
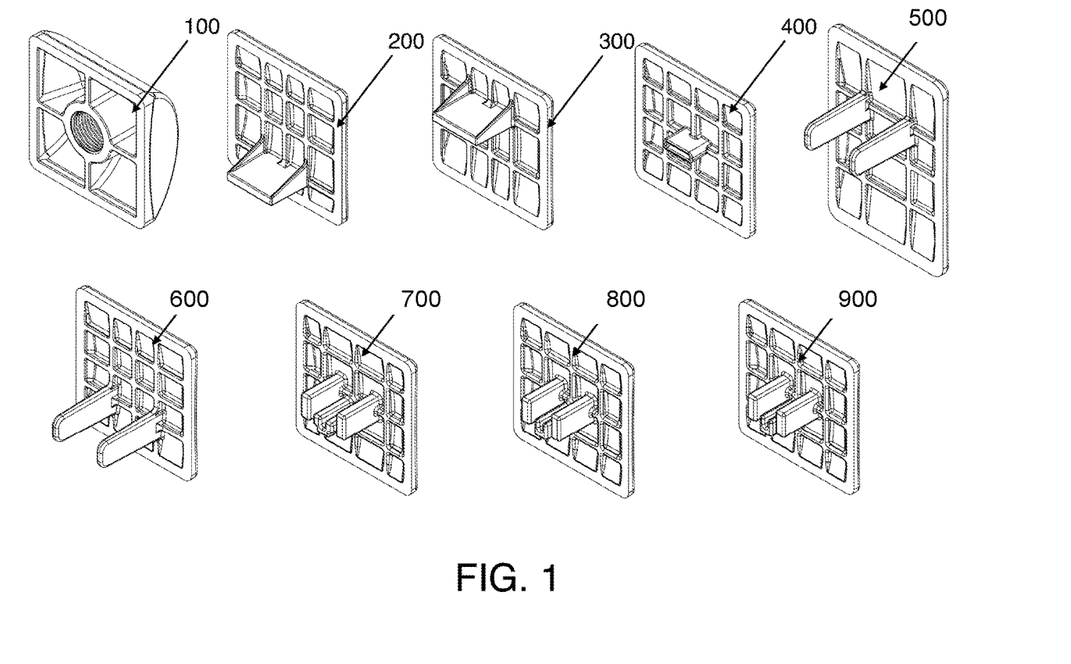
FIG. 1 illustrates a plurality of safety covers in accordance with the present invention.
Figure 2A:
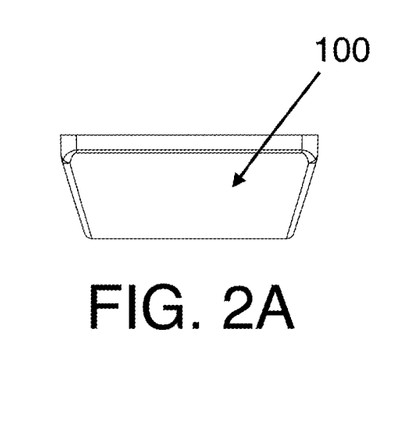
FIGS. 2A-2G illustrate an embodiment for a coaxial safety cover.
Figure 2B:
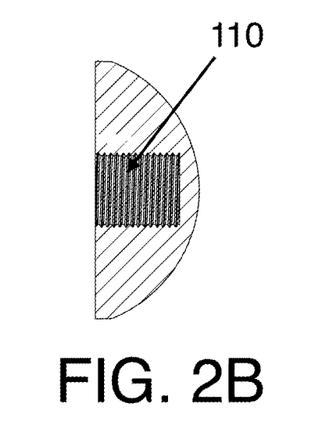
Figure 2C:
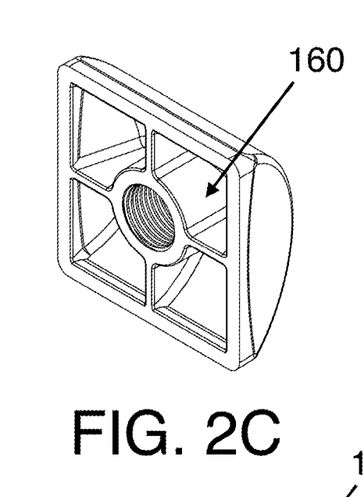
Figure 2D:
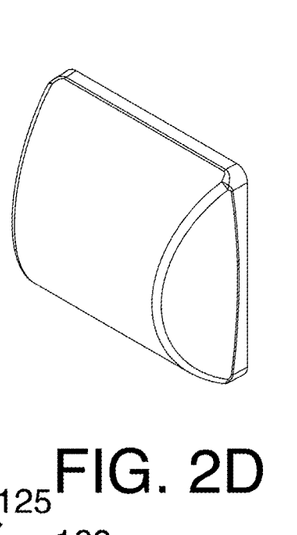
Figure 2E:
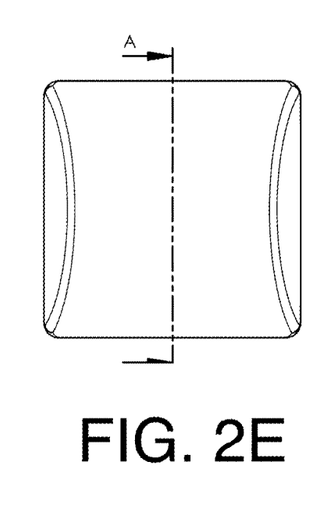
Figure 2F:
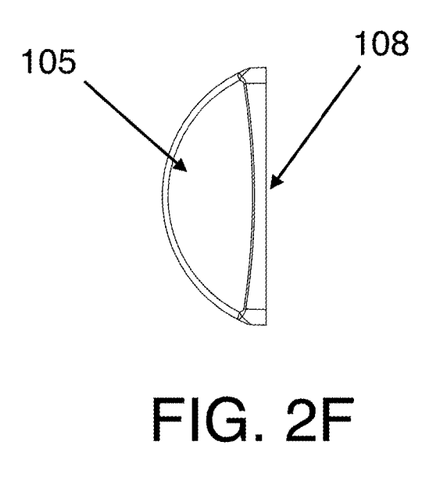
Figure 2G:
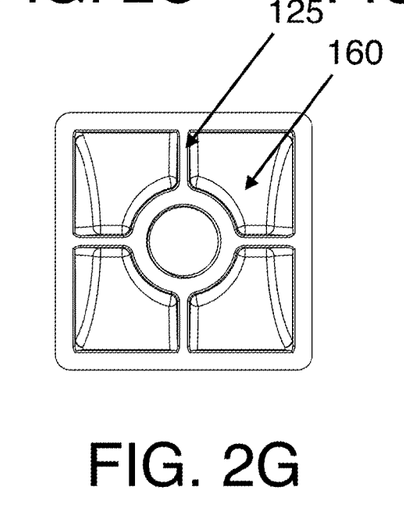
Figure 3A:
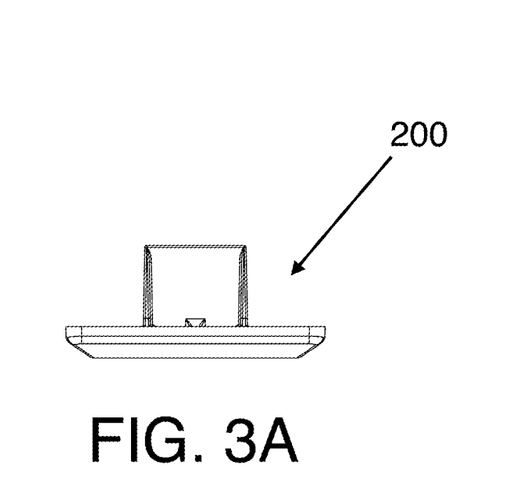
FIGS. 3A-3F illustrate an embodiment for a USB safety cover.
Figure 3B:
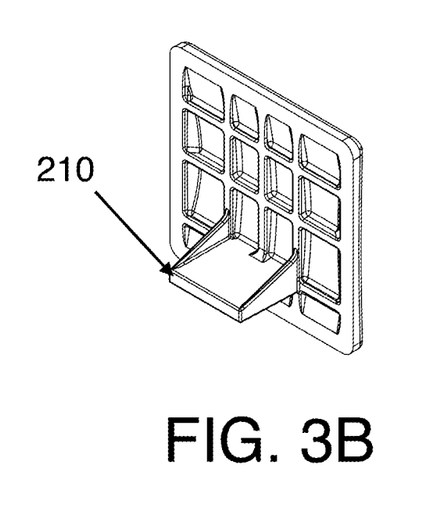
Figure 3C:
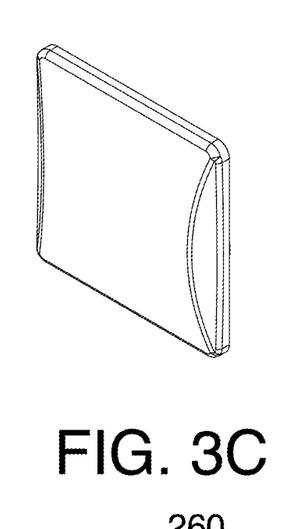
Figure 3D:
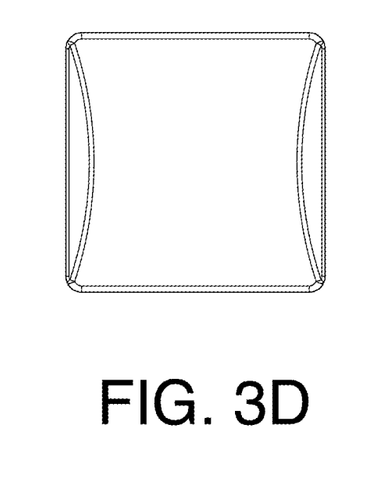
Figure 3E:
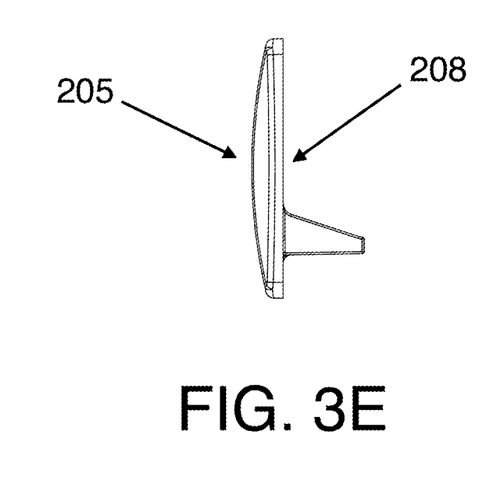
Figure 3F:
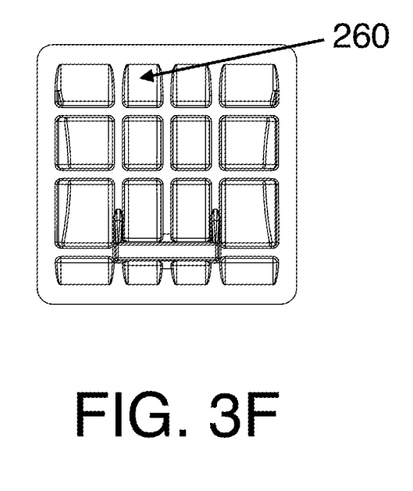
Figure 4A:
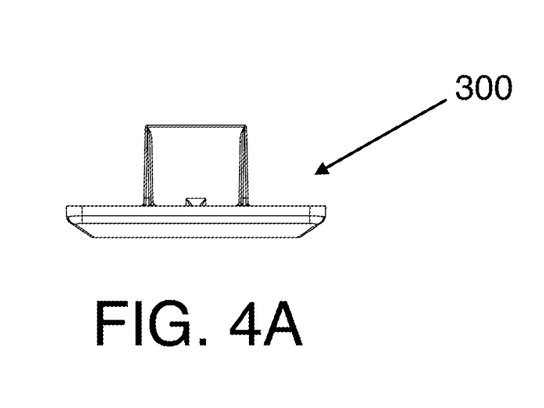
FIGS. 4A-4F illustrate an embodiment for a USB safety cover.
Figure 4B:
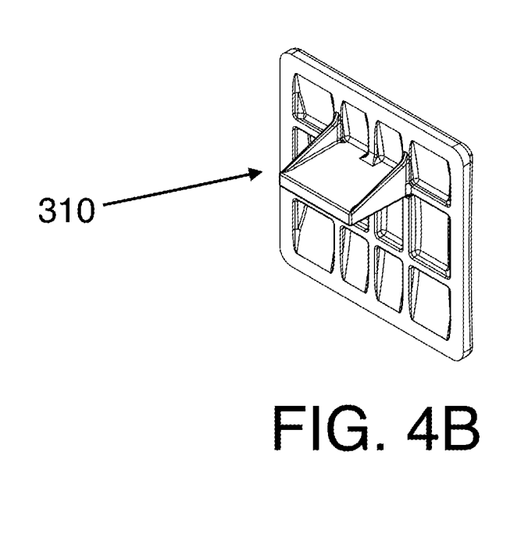
Figure 4C:
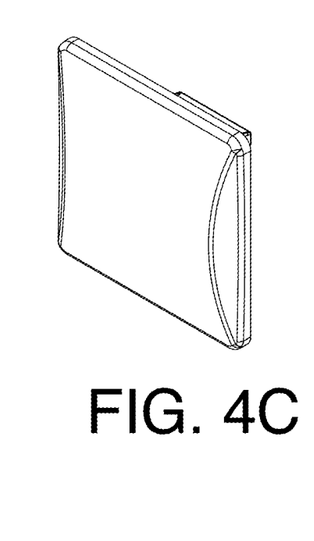
Figure 4D:
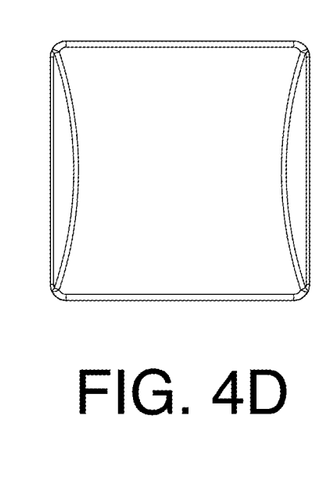
Figure 4E:
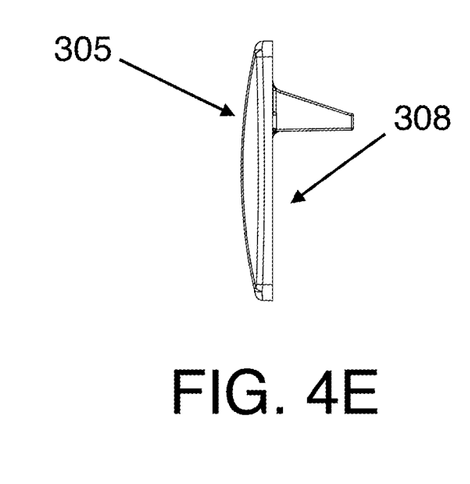
Figure 4F:
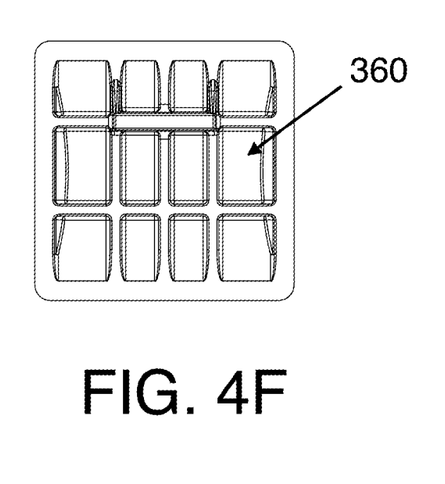
Figure 5A:
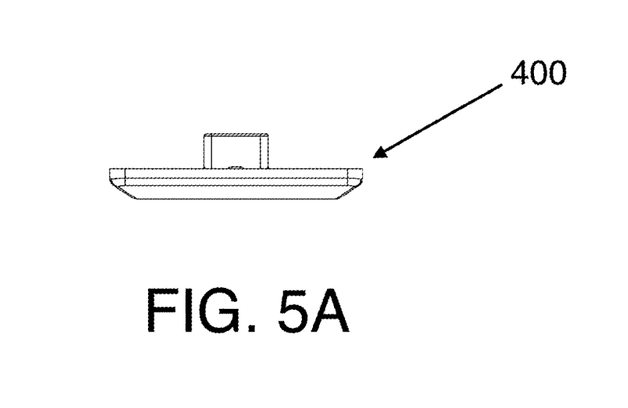
FIGS. 5A-5F illustrate an embodiment for a USB C safety cover.
Figure 5B:
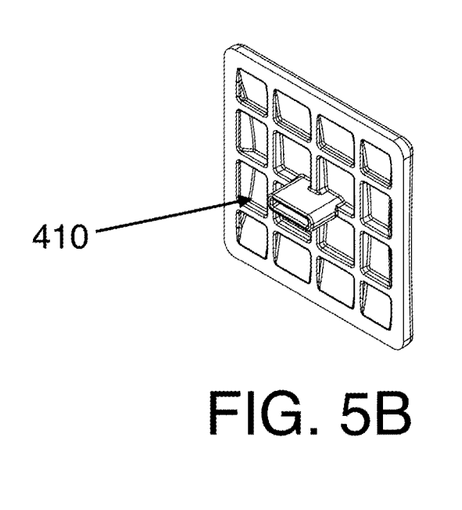
Figure 5C:
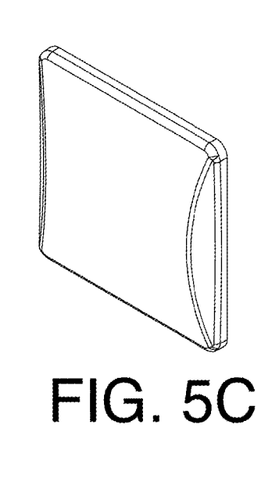
Figure 5D:
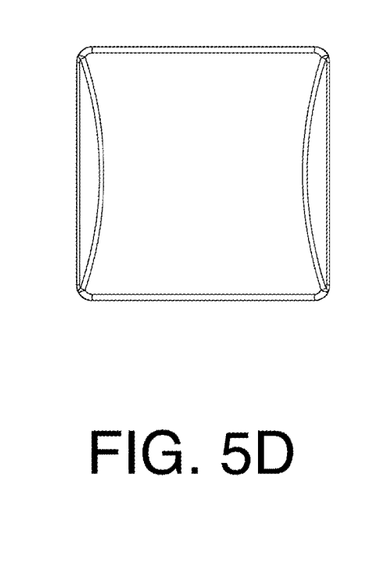
Figure 5E:
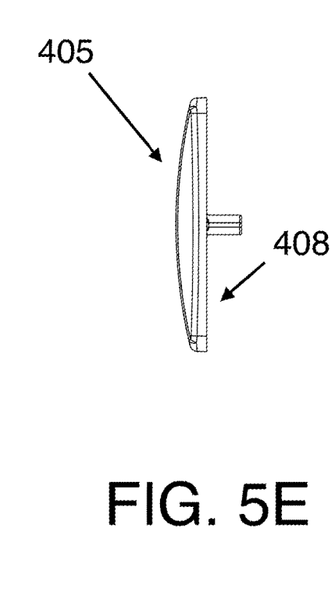
Figure 5F:
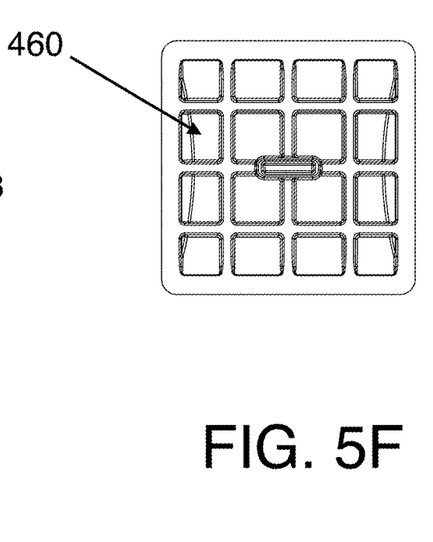
Figure 6A:
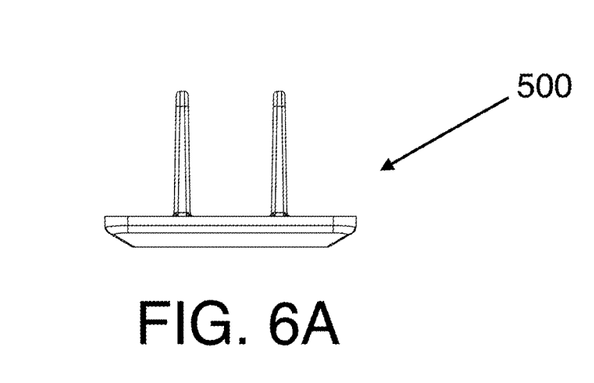
FIGS. 6A-6F illustrate an embodiment for an AC safety cover.
Figure 6B:
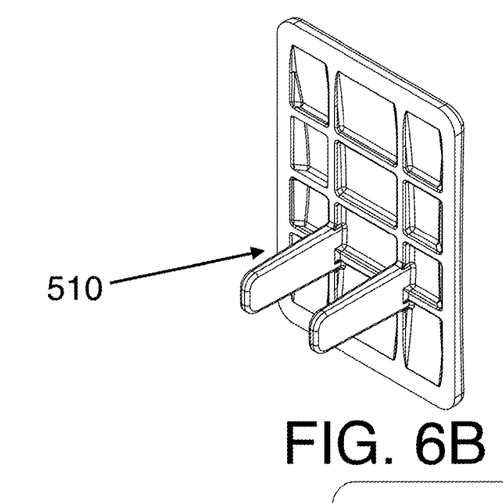
Figure 6C:
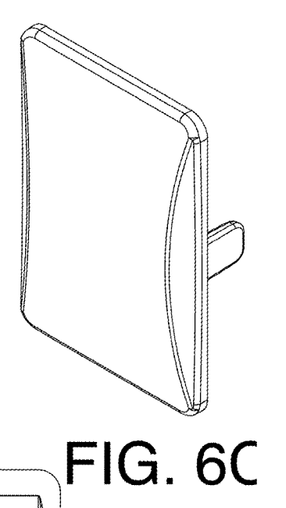
Figure 6D:
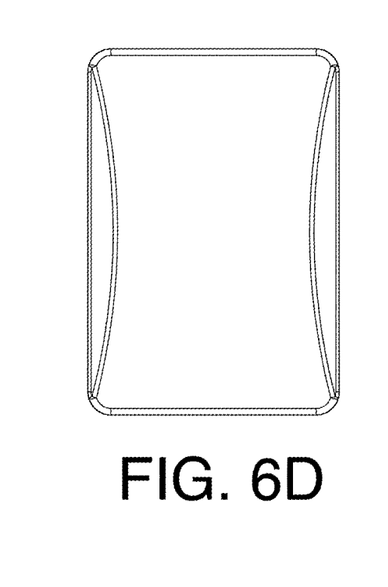
Figure 6E:
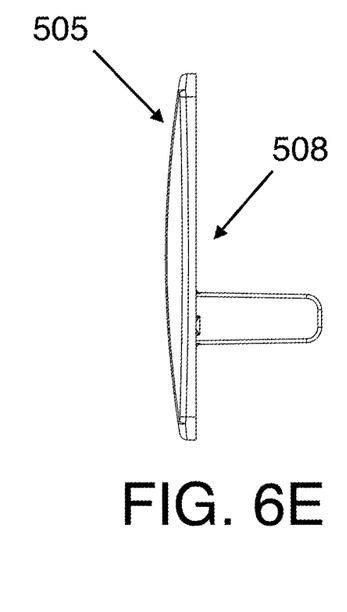
Figure 6F:
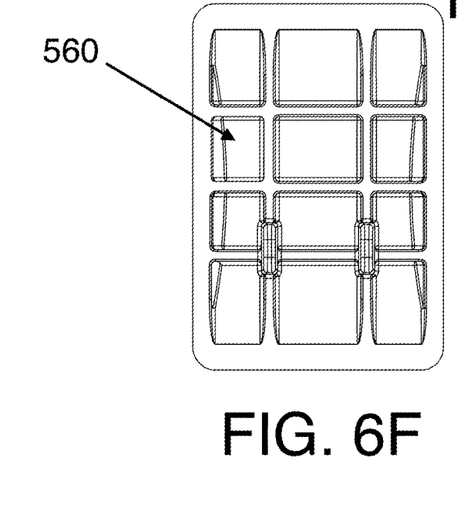
Figure 7A:
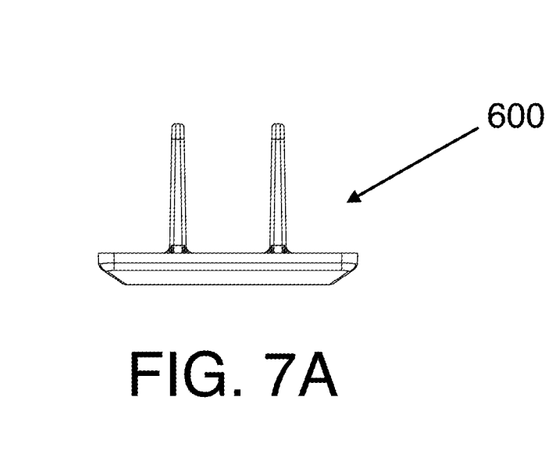
FIGS. 7A-7F illustrate an embodiment for an AC safety cover.
Figure 7B:
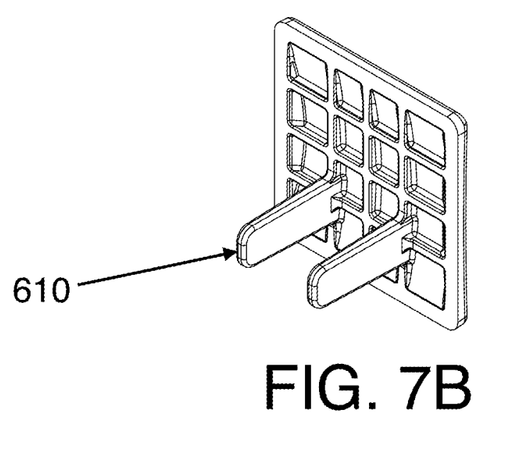
Figure 7C:
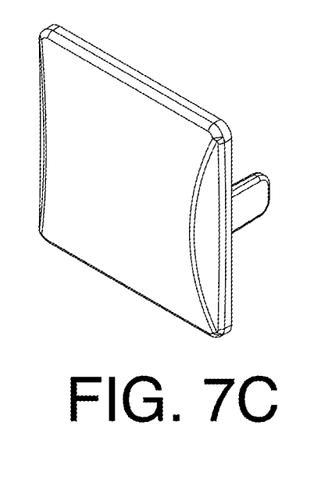
Figure 7D:
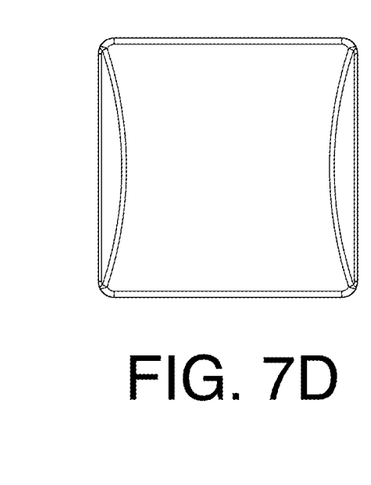
Figure 7E:
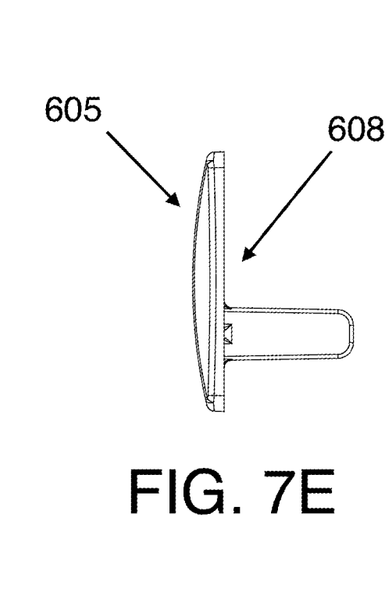
Figure 7F:
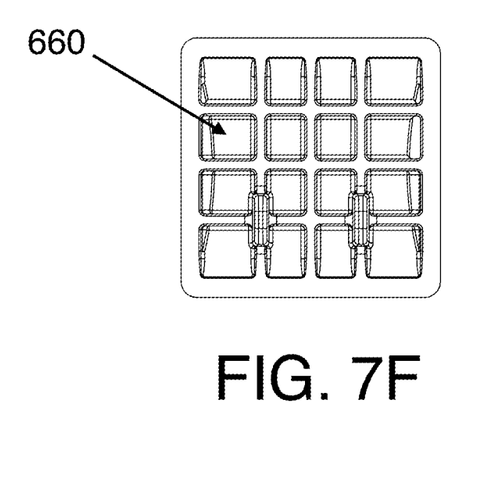
Figure 8A:
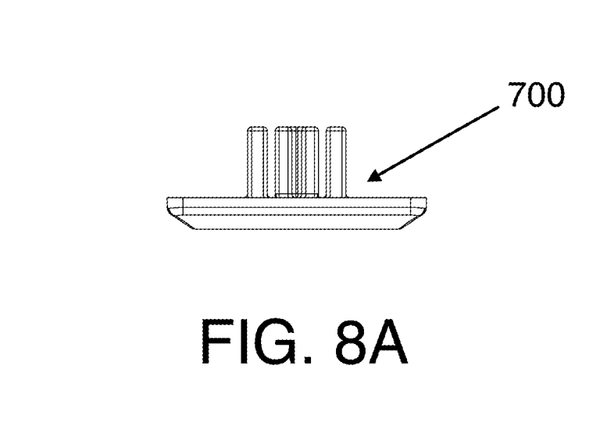
FIGS. 8A-8F illustrate an embodiment for an ethernet safety cover.
Figure 8B:
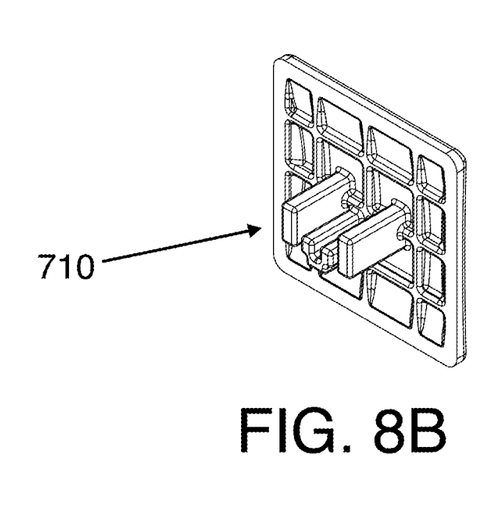
Figure 8C:
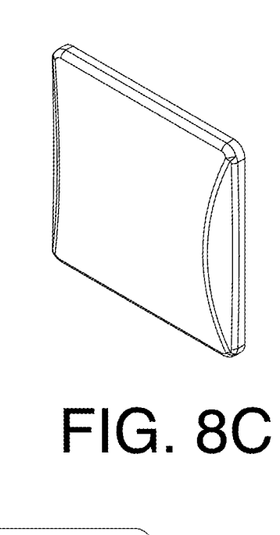
Figure 8D:
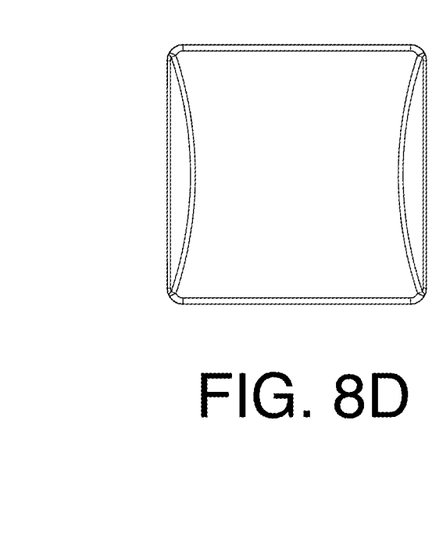
Figure 8E:
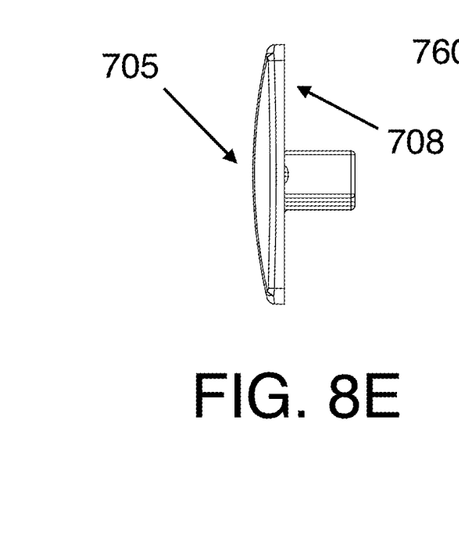
Figure 8F:
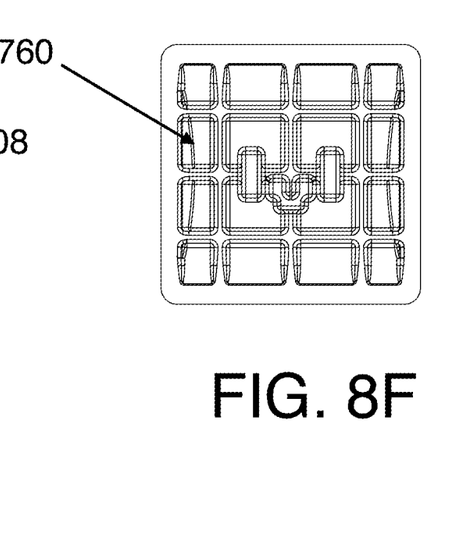
Figure 9A:
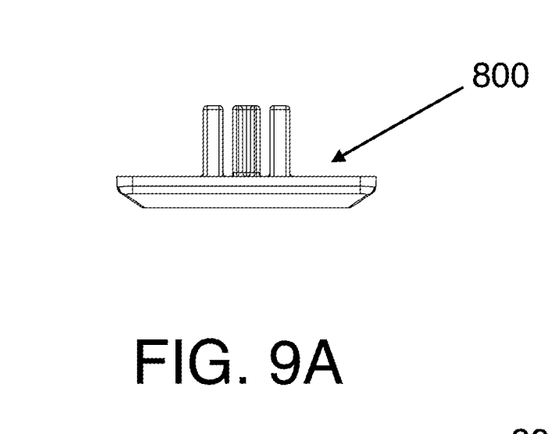
FIGS. 9A-9F illustrate an embodiment for a telephone safety cover.
Figure 9B:
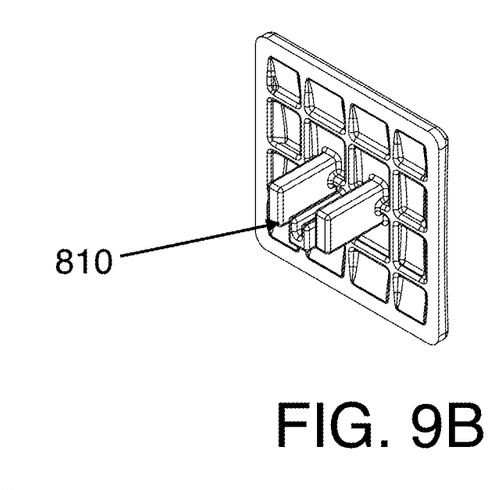
Figure 9C:
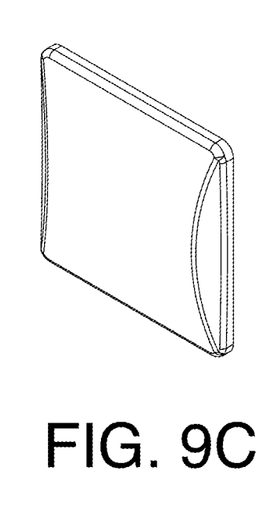
Figure 9D:
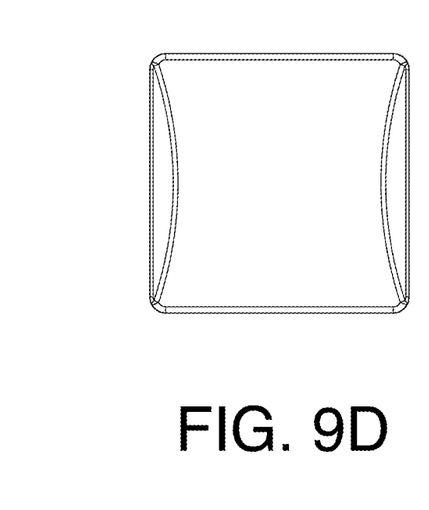
Figure 9E:
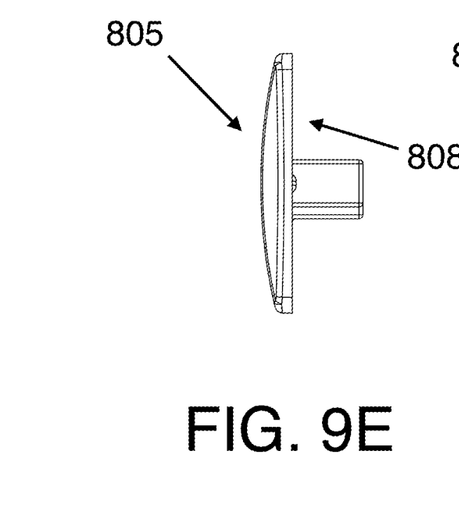
Figure 9F:
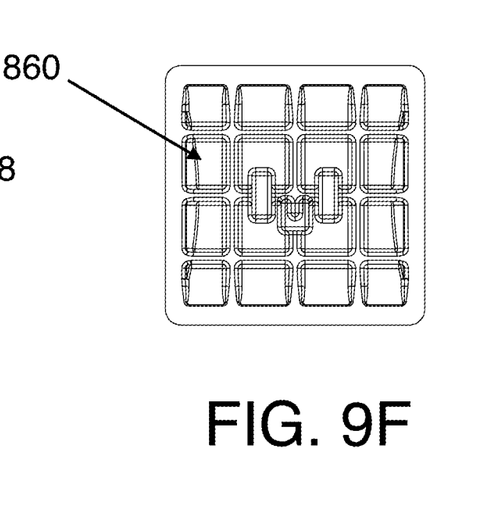
Figures 10A, 10B, 10C, 10D, 10E, 10F:
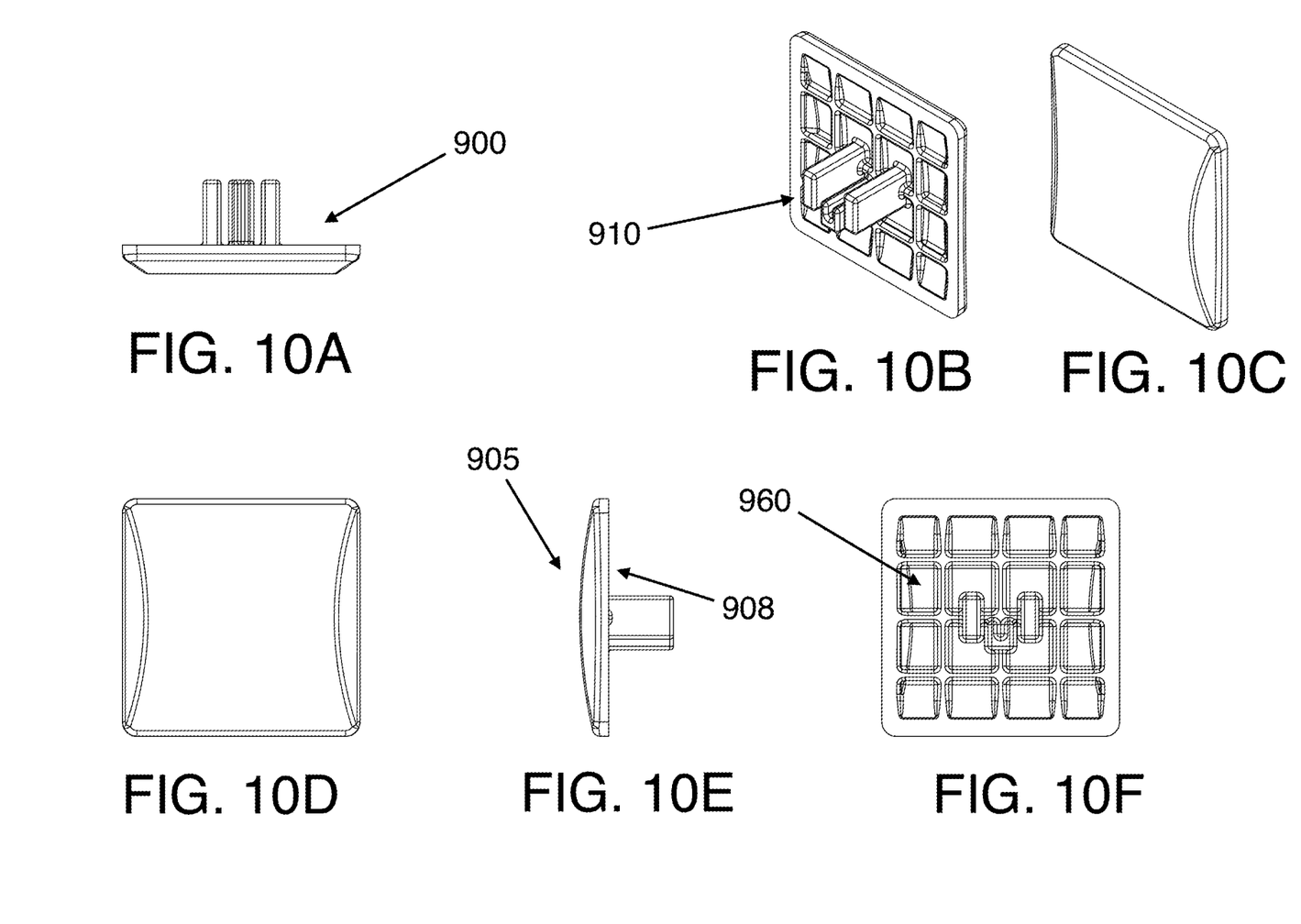
FIGS. 10A-10F illustrate an embodiment for a CAT 3 safety cover.

The present disclosure is generally drawn to a system and method, according to one or more exemplary embodiments, for one or more safety plugs as illustrated in FIG. 1. The safety plugs are designed for parents who are looking to childproof their home, protecting the outlet from a child inserting a foreign material into it and thus cause damage to the said receptacle, and general commercial users who are looking to keep the dust, dirt or grime out of these exposed receptacles thereby extending longevity of said outlets.

The safety plugs may either be individual plates that will insert into unused Telephone, Ethernet, and USB outlets. The safety plug may be an individual coaxial plate that will cover a coaxial stud thus preventing any damage to said coaxial stud or injury to a toddler falling into the wall with the protruding coaxial stud.

With reference now to FIGS. 2A-2G, one exemplary embodiment of a safety plug is shown. Safety plug 100 is designed for a coaxial stud on an outlet. Safety plug 100 has a mostly hollow dome shape having a semi cylindrical or rounded portion 105 and a square base 108 whereby square base 108 comes into contact with the wall that the outlet is positioned on. Safety plug 100 may have a threaded insert 110 that extends from square base 108 into a length of semi cylindrical portion 105 whereby threaded insert 110 does fully not extend to the upper end of semi cylindrical portion 105. When safety plug 100 is positioned over outlet, the coaxial stud is received into the threaded insert whereby the user will twist/turn/screw in safety plug 100 on over the threads of the coaxial stud. Semi cylindrical portion 105 may have four cavities 160 separated by one or more partitions 125 extending along a length of square base 108. Cavities 160 may be symmetrical around threaded insert 110 whereby cavities 160 have three sides forming a right angle pointed to a fourth inward curving side connected to two of the sides such that the fourth inward curving sides form a circle around threaded insert 110.

With reference now to FIGS. 3A-3F, another exemplary embodiment of a safety plug is shown. Safety plug 200 is designed for a lower USB port on an outlet. Safety plug 200 has a semi cylindrical portion 205 and a square base 208 whereby square base 208 comes into contact with the wall that the outlet is positioned on. Semi cylindrical portion 205 may have a plurality of separated cavities 260 extending along a length of square base 208.

Safety plug 200 may have first row of cavities 260 with two outer cavities wider than two inner cavities. Cavities in safety plug 200 as well as other plugs are crucial in strengthening the support of the plug. A second row of cavities 260 may be positioned below the first row of cavities 260 with two outer cavities wider than two inner cavities. A third row of cavities 260 may be positioned below the second row of cavities 260 with two outer cavities wider than two inner cavities whereby cavities 260 in the third row are taller than cavities 260 in the second row. A fourth row of cavities 260 may be positioned below the third row of cavities 260 with two outer cavities wider than two inner cavities whereby cavities 260 in the fourth row are taller than cavities 260 in the first and second row.

Safety plug 200 may have an insert 210 that extends outward from square base 208. When safety plug 200 is positioned over outlet, safety plug 200 may work on friction whereby insert 210 on the back of the plate will slide into the USB receptacle. Insert 210 may have two triangle portions and a rectangle portion connected to the bottom of the triangle portions whereby the portions extend outward from square base 208 opposite of the semi cylindrical portion 205. Triangle portions may be positioned between the inner cavities and outer cavities in the third row of cavities 260 and extend downward past the third row of cavities. Rectangle portion may be positioned between the inner cavities of the third row of cavities 260 and the inner cavities of the fourth row of cavities 260.

With reference now to FIGS. 4A-4F, another exemplary embodiment of a safety plug is shown. Safety plug 300 is designed for a higher USB port on an outlet. Safety plug 300 is designed for a USB port on an outlet. Safety plug 300 has a semi cylindrical portion 305 and a square base 308 whereby square base 308 comes into contact with the wall that the outlet is positioned on. Semi cylindrical portion 305 may have a plurality of separated cavities 360 extending along a length of square base 308. Safety plug 300 may have first row of cavities 360 with two outer cavities wider than two inner cavities. A second row of cavities 360 may be positioned below the first row of cavities 360 with two outer cavities wider than two inner cavities. A third row of cavities 360 may be positioned below the second row of cavities 360 with two outer cavities wider than two inner cavities whereby cavities 360 in the third row are taller than cavities 360 in the second row. A fourth row of cavities 360 may be positioned below the third row of cavities 360 with two outer cavities wider than two inner cavities whereby cavities 360 in the fourth row are taller than cavities 360 in the first and second row.

Safety plug 300 may have an insert 310 that extends outward from square base 308. When safety plug 300 is positioned over outlet, safety plug 300 may work on friction whereby insert 310 on the back of the plate will slide into the USB receptacle. Insert 310 may have two triangle portions and a rectangle portion connected to the bottom of the triangle portions whereby the portions extend outward from square base 308 opposite of the semi cylindrical portion 305. Triangle portions may be positioned between the inner cavities and outer cavities in the first row of cavities 360 and extend downward past the first row of cavities. Rectangle portion may be positioned between the inner cavities of the first row of cavities 360 and the inner cavities of the second row of cavities 360.

With reference now to FIGS. 5A-5F, another exemplary embodiment of a safety plug is shown. Safety plug 400 is designed for a USB C port on an outlet. Safety plug 400 has a semi cylindrical portion 405 and a square base 408 whereby square base 408 comes into contact with the wall that the outlet is positioned on. Semi cylindrical portion 405 may have a plurality of separated cavities 460 extending along a length of square base 408. Safety plug 400 may have first row of cavities 460 with two inner cavities wider than two outer cavities. A second row of cavities 460 may be positioned below the first row of cavities 460 with two inner cavities wider than two outer cavities. A third row of cavities 460 may be positioned below the second row of cavities 460 with two inner cavities wider than two outer cavities. A fourth row of cavities 460 may be positioned below the third row of cavities 460 with two inner cavities wider than two outer cavities whereby cavities 460 in the second and third row are taller than cavities 460 in the first and fourth row.

Safety plug 400 may have an insert 410 that extends outward from square base 408. When safety plug 400 is positioned over outlet, safety plug 400 may work on friction whereby insert 410 on the back of the plate will slide into the USB C receptacle. Insert 410 may have a discorectangle portion whereby the discorectangle portion extends outward from square base 408 opposite of the semi cylindrical portion 405. Discorectangle portion may be positioned between the inner cavities of the second row of cavities 460 and the inner cavities of the third row of cavities 460.

With reference now to FIGS. 6A-6F, another exemplary embodiment of a safety plug is shown. Safety plug 500 is designed for an AC port on an outlet port as well as the two USB outlets below it but leaving the second AC port open and available for use. Safety plug 500 has a semi cylindrical portion 505 and a rectangle base 508 whereby rectangle base 508 comes into contact with the wall that the outlet is positioned on. Semi cylindrical portion 505 may have a plurality of separated cavities 560 extending along a length of rectangle base 508. Safety plug 500 may have first row of cavities 560 with an inner cavity wider than two outer cavities. A second row of cavities 560 may be positioned below the first row of cavities 560 with an inner cavity wider than two outer cavities. A third row of cavities 560 may be positioned below the second row of cavities 560 with an inner cavity wider than two outer cavities. A fourth row of cavities 560 may be positioned below the third row of cavities 560 with an inner cavity wider than two outer cavities whereby cavities 560 in the second and third row are shorter than cavities 560 in the first and fourth row.

Safety plug 500 may have an insert 510 that extends outward from rectangle base 508. When safety plug 500 is positioned over outlet, safety plug 500 may work on friction whereby insert 510 on the back of the plate will slide into the AC receptacle. Insert 510 may have two prong portions whereby the prong portions extend outward from rectangle base 508 opposite of the semi cylindrical portion 505. Prong portions may be positioned between the inner of the first and second row of cavities 560 and the outer cavities of the first and second row of cavities 560.

With reference now to FIGS. 7A-7F, another exemplary embodiment of a safety plug is shown. Safety plug 600 is designed for an AC port on an outlet. Safety plug 600 has a semi cylindrical portion 605 and a rectangle base 608 whereby rectangle base 608 comes into contact with the wall that the outlet is positioned on. Semi cylindrical portion 605 may have a plurality of separated cavities 660 extending along a length of rectangle base 608. Safety plug 600 may have first row of cavities 660 with two outer cavities wider than two inner cavities. A second row of cavities 660 may be positioned below the first row of cavities 660 with two outer cavities wider than two inner cavities. A third row of cavities 660 may be positioned below the second row of cavities 660 with two outer cavities wider than two inner cavities. A fourth row of cavities 660 may be positioned below the third row of cavities 660 with two outer cavities wider than two inner cavities.

Safety plug 600 may have an insert 610 that extends outward from rectangle base 608. When safety plug 600 is positioned over outlet, safety plug 600 may work on friction whereby insert 610 on the back of the plate will slide into the AC receptacle. Insert 610 may have two prong portions whereby the prong portions extend outward from rectangle base 608 opposite of the semi cylindrical portion 605. Prong portions may be positioned between the inner of the third and fourth row of cavities 660 and the outer cavities of the third and fourth row of cavities 660.

With reference now to FIGS. 8A-8F, another exemplary embodiment of a safety plug is shown. Safety plug 700 is designed for an ethernet port on an outlet. Safety plug 700 has a semi cylindrical portion 705 and a square base 708 whereby square base 708 comes into contact with the wall that the outlet is positioned on. Semi cylindrical portion 705 may have a plurality of separated cavities 760 extending along a length of square base 708. Safety plug 700 may have first row of cavities 760 with two inner cavities wider than two outer cavities. A second row of cavities 760 may be positioned below the first row of cavities 760 with two inner cavities wider than two outer cavities. A third row of cavities 760 may be positioned below the second row of cavities 760 with two inner cavities wider than two outer cavities. A fourth row of cavities 760 may be positioned below the third row of cavities 760 with two inner cavities wider than two outer cavities whereby cavities 760 in the second and third row are taller than cavities 760 in the first and fourth row.

Safety plug 700 may have an insert 710 that extends outward from square base 708. When safety plug 700 is positioned over outlet, safety plug 700 may work on friction whereby insert 710 on the back of the plate will slide into the ethernet receptacle. Insert 710 may have a two prong portions whereby the prong portion extends outward from square base 708 opposite of the semi cylindrical portion 705. Prong portions may be positioned between the inner cavities of the third row of cavities 760 and the inner cavities of the third row of cavities 760. Insert may have middle component with two horizontal sides that outwardly curve into two vertical sides that extend downward from the two horizontal sides at a perpendicular angle. The two horizontal sides may be connected by a U-shaped side extending downward. The two vertical sides may be connected to two curved portions that extend downward and curve into a horizontal portion.

With reference now to FIGS. 9A-9F, another exemplary embodiment of a safety plug is shown. Safety plug 800 is designed for a telephone port on an outlet. Safety plug 800 has a semi cylindrical portion 805 and a square base 808 whereby square base 808 comes into contact with the wall that the outlet is positioned on. Semi cylindrical portion 805 may have a plurality of separated cavities 860 extending along a length of square base 808. Safety plug 800 may have first row of cavities 860 with two inner cavities wider than two outer cavities. A second row of cavities 860 may be positioned below the first row of cavities 860 with two inner cavities wider than two outer cavities. A third row of cavities 860 may be positioned below the second row of cavities 860 with two inner cavities wider than two outer cavities. A fourth row of cavities 860 may be positioned below the third row of cavities 860 with two inner cavities wider than two outer cavities whereby cavities 860 in the second and third row are taller than cavities 860 in the first and fourth row.

Safety plug 800 may have an insert 810 that extends outward from square base 808. When safety plug 800 is positioned over outlet, safety plug 800 may work on friction whereby insert 810 on the back of the plate will slide into the telephone receptacle. Insert 810 may have a two prong portions whereby the prong portion extends outward from square base 808 opposite of the semi cylindrical portion 805. Prong portions may be positioned between the inner cavities of the third row of cavities 860 and the inner cavities of the third row of cavities 860. Insert may have middle component with two vertical sides that are connected by a U-shaped side extending downward. The two vertical sides may curve into a horizontal side.

With reference now to FIGS. 10A-10F, another exemplary embodiment of a safety plug is shown. Safety plug 900 is designed for a CAT 3 port on an outlet. Safety plug 900 has a semi cylindrical portion 905 and a square base 908 whereby square base 908 comes into contact with the wall that the outlet is positioned on. Semi cylindrical portion 905 may have a plurality of separated cavities 960 extending along a length of square base 908. Safety plug 900 may have first row of cavities 960 with two inner cavities wider than two outer cavities. A second row of cavities 960 may be positioned below the first row of cavities 960 with two inner cavities wider than two outer cavities. A third row of cavities 960 may be positioned below the second row of cavities 960 with two inner cavities wider than two outer cavities. A fourth row of cavities 960 may be positioned below the third row of cavities 960 with two inner cavities wider than two outer cavities whereby cavities 960 in the second and third row are taller than cavities 960 in the first and fourth row.

Safety plug 900 may have an insert 910 that extends outward from square base 908. When safety plug 900 is positioned over outlet, safety plug 900 may work on friction whereby insert 910 on the back of the plate will slide into the CAT 3 receptacle. Insert 910 may have a two prong portions whereby the prong portion extends outward from square base 908 opposite of the semi cylindrical portion 905. Prong portions may be positioned between the inner cavities of the second row of cavities 960 and the inner cavities of the third row of cavities 960. Insert may have middle component with two vertical sides that are connected by a U-shaped side extending downward. The two vertical sides may curve into a horizontal side.

The foregoing description of the invention has been presented for purposes of illustration and description and is not intended to be exhaustive or to limit the invention to the precise form disclosed. Many modifications and variations are possible in light of the above teaching. The embodiments were chosen and described to best explain the principles of the invention and its practical application to thereby enable others skilled in the art to best use the invention in various embodiments and with various modifications suited to the use contemplated.

What is claimed is:

1. A safety cover having a base, the safety cover having cavities and an insert, wherein the insert extends outward from the base, wherein there are multiple rows of the cavities, wherein the cavities each have vertical ridges connected to horizontal ridges, wherein there is a distance between lower horizontal ridges of a first cavity and upper horizontal ridges of a second cavity that is below the first cavity, wherein there is a second distance between first side vertical ridges of a third cavity and second side vertical ridges of a fourth cavity, wherein the first distance and the second distance are at greatest distance on the safety cover from the base.

2. The safety cover of claim 1, where the insert is positioned over a ridge between a first row of the cavities and a second row of the cavities.

3. The safety cover of claim 1, wherein there are three rows of the cavities.

4. The safety cover of claim 1, wherein there are four rows of the cavities.

5. A safety cover having an insert and cavities each having a rectangular shape and positioned in a checkered formation having a plurality of rows on top of one another each with a series of rectangles, wherein the cavities are separated by ridges, wherein the insert extends outward from the safety cover.

6. The safety cover of claim 5, where the insert is positioned over a ridge between a first row of the cavities and a second row of the cavities.

7. The safety cover of claim 5, wherein there are three rows and four columns of the cavities.

8. The safety cover of claim 5, wherein there are four rows and four columns of the cavities.

9. The safety cover of claim 5, the insert has two prong portions wherein the two prong portions extend outward from a base.

10. The safety cover of claim 5, wherein two prong portions are positioned between the cavities.

11. A safety cover having a base, the safety cover having cavities and an insert, wherein the insert has two prong portions that extend outward from the base, wherein the safety cover has first row of the cavities, a second row of the cavities positioned below the first row of the cavities, a third row of the cavities positioned below the second row of the cavities, and a fourth row of the cavities positioned below the third row of cavities, wherein the two prong portions are positioned over a ridge between the third row of cavities and the fourth row of cavities.

* * * * *